US012684627B2

(12) United States Patent
Guo et al.

(10) Patent No.: US 12,684,627 B2
(45) Date of Patent: Jul. 14, 2026

(54) PRIORITY-BASED ACCESS FOR CHANNEL OCCUPANCY TIME

(71) Applicant: QUALCOMM Incorporated, San Diego, CA (US)

(72) Inventors: Shaozhen Guo, Beijing (CN); Jing Sun, San Diego, CA (US); Changlong Xu, Beijing (CN); Aleksandar Damnjanovic, Del Mar, CA (US); Xiaoxia Zhang, San Diego, CA (US); Luanxia Yang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 18/556,445

(22) PCT Filed: Jun. 21, 2021

(86) PCT No.: PCT/CN2021/101186
§ 371 (c)(1),
(2) Date: Oct. 20, 2023

(87) PCT Pub. No.: WO2022/266791
PCT Pub. Date: Dec. 29, 2022

(65) Prior Publication Data
US 2024/0188147 A1      Jun. 6, 2024

(51) Int. Cl.
*H04W 74/06* (2009.01)
*H04W 74/08* (2009.01)
*H04W 74/0808* (2024.01)
(52) U.S. Cl.
CPC ... *H04W 74/0875* (2013.01); *H04W 74/0808* (2013.01)

(58) Field of Classification Search
CPC ..................... H04W 74/0875; H04W 74/0808
See application file for complete search history.

(56)                References Cited

U.S. PATENT DOCUMENTS

| | | | |
|---|---|---|---|
| 2018/0049221 A1 | 2/2018 | Park et al. | |
| 2019/0200386 A1 | 6/2019 | Yang et al. | |
| 2023/0354409 A1* | 11/2023 | Chien .................... | H04W 72/23 |
| 2023/0354420 A1* | 11/2023 | Chen ................... | H04W 72/542 |
| 2024/0089954 A1* | 3/2024 | Wong ................ | H04W 74/0816 |
| 2025/0016826 A1* | 1/2025 | Calcev ................. | H04W 72/02 |
| 2025/0024505 A1* | 1/2025 | Calcev ............. | H04W 74/0808 |

FOREIGN PATENT DOCUMENTS

WO          2021062118 A1      4/2021

OTHER PUBLICATIONS

International Search Report and Written Opinion—PCT/CN2021/101186—ISA/EPO—Dec. 14, 2021.
Le T-K., et al., "Frame Based Equipment Channel Access Enhancements NR Unlicensed Spectrum for URLLC Transmissions," in arxiv.org, Cornell University Library, 201 OLIN Library Cornell University Ithaca, NY 14853, Nov. 25, 2020 (Nov. 25, 2020), XP081867813, 24 pages, section IV, p. 15-p. 17, figure 6.

* cited by examiner

*Primary Examiner* — Ajay Cattungal
(74) *Attorney, Agent, or Firm* — Harrity & Harrity, LLP

(57)                ABSTRACT

A method of wireless communication performed by a user equipment (UE), the method comprising identifying a priority level associated with the UE; and performing a clear channel assessment for a channel occupancy time (COT) according to an offset parameter, wherein the offset parameter is based on the priority level associated with the UE.

30 Claims, 13 Drawing Sheets

1000

1100

BASE STATION 1100

Processor 1102

MEMORY 1104

Instructions 1106

Prioity Access Module 1108

Transceiver 1110

Modem 1112

RF Unit 1114

Antennas 1116

1200

1210

Identify, by a user equipment (UE), a priority level associated with the UE

1220

Perform a clear channel assessment for a channel occupancy time (COT) according to an offset parameter, wherein the offset parameter is based on the priority level associated with the UE.

1300

| |
|---|
| Receive, by a base station (BS), from a first user equipment (UE), a signal |

1310

| |
|---|
| Transmit, based on the receiving the signal and based on a priority level associated with the first UE being higher than a priority level associated with a second UE, a receiver protection signal during a time period associated with a clear channel assessment of the second UE |

1320

PRIORITY-BASED ACCESS FOR CHANNEL OCCUPANCY TIME

CROSS-REFERENCE TO RELATED APPLICATIONS

The present application is a 35 U.S.C. 371 National Phase entry of Patent Cooperation Treaty (PCT) Application No. PCT/CN2021/101186, filed Jun. 21, 2021, which is hereby expressly incorporated herein by reference in its entirety.

TECHNICAL FIELD

This application relates to wireless communication systems, and more particularly to controlling access to channel occupancy time based on priority levels.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an UL transmission in an unlicensed frequency band. The UE may perform an LBT procedure prior to the scheduled time. When the LBT is a success, the UE may proceed to transmit UL data according to the schedule. When the LBT fails, the UE may refrain from transmitting.

In some instances, channel access may utilize a frame-based equipment (FBE) configuration, where an FBE frame may include an idle period and channel occupancy time (COT). The idle period may be at the beginning or the end of the FBE frame. In some instances, the COT may be a floating COT. The starting time of a floating COT may vary from one FBE frame to another FBE frame.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure a method of wireless communication performed by a user equipment (UE) may include identifying a priority level associated with the UE; and performing a clear channel assessment for a channel occupancy time (COT) according to an offset parameter, wherein the offset parameter is based on the priority level associated with the UE.

In an additional aspect of the disclosure, a method of wireless communication performed by a base station (BS) may include receiving, from a first user equipment (UE), a signal; and transmitting, based on the receiving the signal and based on a priority level associated with the first UE being higher than a priority level associated with a second UE, a receiver protection signal during a time period associated with a clear channel assessment of the second UE.

In an additional aspect of the disclosure, a user equipment (UE) may include a transceiver, a memory, and a processor coupled to the transceiver and the memory, the UE may be configured to identify a priority level associated with the UE; and perform a clear channel assessment for a channel occupancy time (COT) according to an offset parameter, wherein the offset parameter is based on the priority level associated with the UE.

In an additional aspect of the disclosure, a base station (BS) may include a transceiver, a memory, and a processor coupled to the transceiver and the memory, the BS may be configured to receive, from a first user equipment (UE), a signal; and transmit, based on the receiving the signal and based on a priority level associated with the first UE being higher than a priority level associated with a second UE, a receiver protection signal during a time period associated with a clear channel assessment of the second UE.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
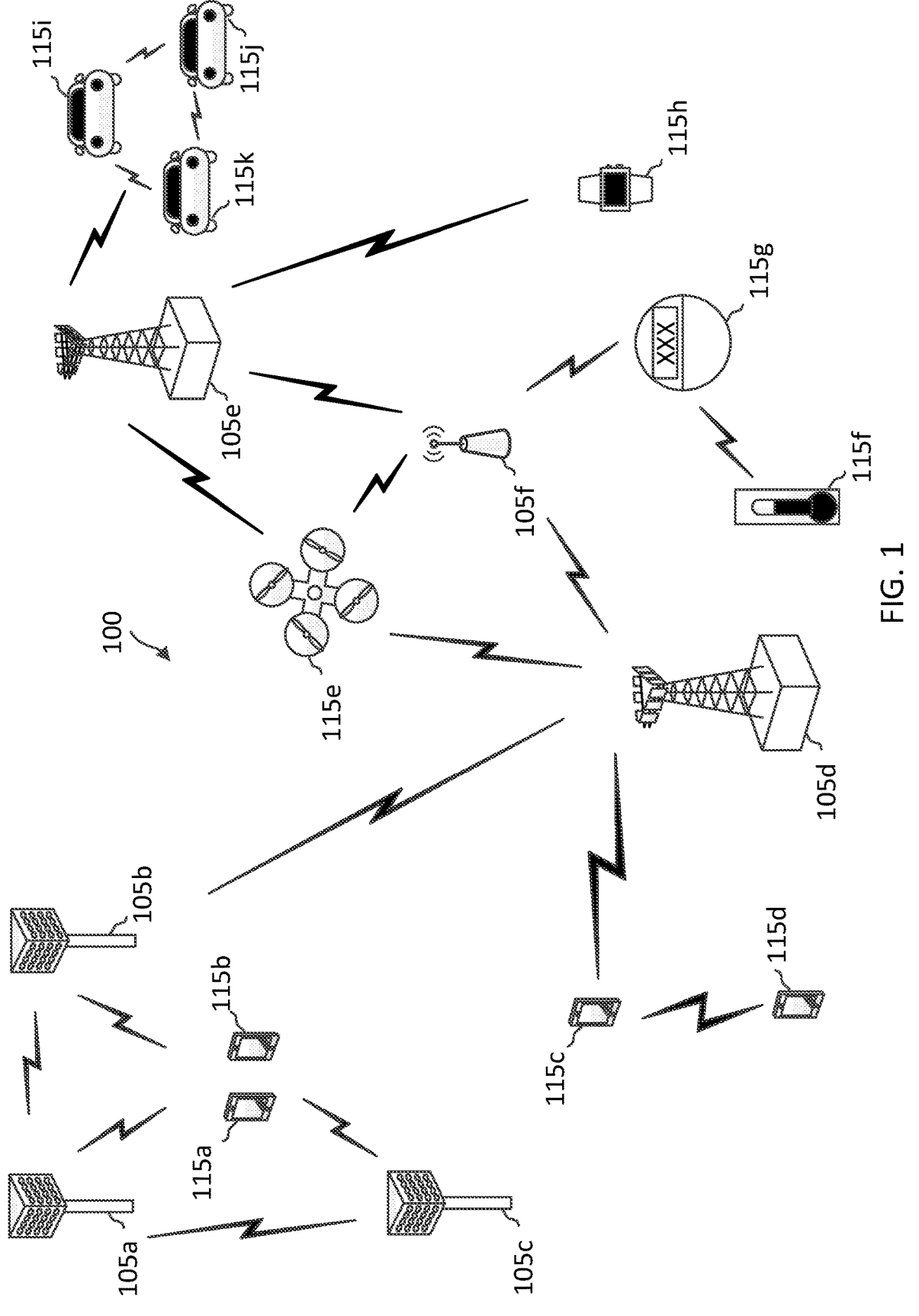
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a cellular wireless communication network, a UE may request a connection setup to the network, commonly referred to as random access. The random access plays three main roles, including: (i) establishment of a radio link and uplink synchronization for initial access (ii) to re-establish a radio link after radio-link failure (iii) for handover when uplink synchronization needs to be established to the new cell. The UE may initiate a random access procedure in an uplink Random Access Channel (RACH). The first step in the random access procedure is the transmission of a random access preamble. The main purpose of the preamble transmission is to notify the presence of a random access attempt to the BS and to allow the BS to estimate the delay between the BS and the UE. The delay estimate will be used to adjust the uplink timing.

The time frequency resources on which the random access preamble is transmitted is known as the Physical Random Access Channel (PRACH). The network broadcast information to all the UEs which time-frequency resources (PRACH resources) are allowed for the preamble transmission on Downlink Physical Broadcast Channel (DL-PBCH). For instance, the PRACH information may be informed to the UEs via System Information Block (SIB) 2.

In some aspects, a wireless communication network can operate over an unlicensed band. The deployment of NR over an unlicensed spectrum is referred to as NR-unlicensed (NR-U). Channel access in unlicensed bands, such as 5 GHz and 6 GHz bands, may be regulated by authorities, such as Federal Communications Commission (FCC). For example, FCC imposes various regulations on the maximum equivalent isotropically radiated power (EIRP) and the maximum EIRP power spectral density (PSD) that a transmitting node may transmit in a 6 GHz band. EIRP may refer to the amount of power a radio transmitter system (including transmitter and radiating antenna) may emit. EIRP PSD may refer to the amount of power per bandwidth unit a radio transmitter system may emit.

One issue of cellular network operating in unlicensed spectrum is to ensure a fair coexistence with other unlicensed system (e.g., Wi-Fi). Fairness for NR-U device is defined as the ability that the NR-U device does not impact the other devices operating in the same band. For example, the regulation mandates the use of Listen-Before-Talk (LBT) protocols. LBT is a spectrum sharing mechanism by which a device senses the spectrum band using a Clear Channel Assessment (CCA) check before accessing the channel. As described herein, the terms "LBT" and "CCA" may be used interchangeably.

An NR-U UE or BS may first sense the communications channel to find out there is no communication prior to any transmission. In some aspects, the channel sensing procedure relies on detecting energy level on multiple sub-bands of the of the frequency band. The LBT parameters (e.g., duration, CCA parameters, etc.) are configured in the UE by the BS.

There are two types of LBT procedures, a frame based equipment (FBE) based LBT and a load based equipment (LBE) based LBT. In FBE-based LBT, channel sensing is performed at predetermined time instants. For instance, if the channel is busy, a transmitting node may back off for a predetermined time period and sense the channel again after this period. In LBE-based LBT, channel sensing is performed at any time instant and random back-off is used if the channel is found busy. For instance, in the FBE mode, the NR-U unlicensed devices (e.g., UE, BS) are allowed to contend for the channel beginning only at synchronized frame boundaries. The FBE NR-U device has to detect the energy level at a designated time equal to CCA period. If the energy level in the channel is below the CCA threshold, then the equipment can transmit for a duration, which may be referred to as a Channel Occupancy Time (COT), within an FBE frame.

In some aspects, a BS may broadcast system information in a network to facilitate UEs in accessing the network. The system information may be in the form of a set of Synchronization Signal Blocks (SSBs) and/or RMSI (Remaining Minimum System Information). In some aspects, the BS may transmit SSBs in the form of SSB burst, where an SSB burst may include a set of SSB, and may repeat the transmission of the SSB burst according to a certain SSB periodicity. In some instances, the BS may broadcast RMSI indicating an FBE transmission configuration via a downlink BCH. The FBE transmission configuration may also be referred to as a Fixed Frame Period (FFP) configuration. As described herein, the terms "FBE frames" and "FFPs" may be used interchangeably. In some instances, the RMSI may include a system information block 1 (SIB-1) carrying the FFP configuration. In some other instances, the BS may signal the FFP configuration for a UE with UE specific RRC signaling, for example, for an FBE Secondary Cell (sCell).

As described in 3GPP Release 16 specifications, in the FBE mode of operation, the FBE mode (e.g., semi-static channel access) may be signaled in the RMSI. The fixed frame period configuration may be signaled in the SIB (e.g., SIB-1). In some instances, the FBE frame may include a COT that may start at the beginning of the fixed frame period (FFP). The FFP may be a period at which the FBE frame is repeated. For example, the FFP may include a time period of 1 ms, 2 ms, 2.5 ms, 4 ms, 5 ms, 10 ms, or another time period. In some instances, the FBE frame may include a COT that may start at various times within the fixed frame period (FFP). A COT that may start at various times within the fixed frame period (FFP) may be referred to as a floating COT. For example, an FBE frame may include an idle period at the beginning of the frame, at the end of the frame, or at the beginning and end of the frame. The idle period may include a time value restricted to a minimum or maximum time period. For example, the idle period may have a minimum period of 5% of the FFP or 100 us, whichever is greater.

In some aspects of the present disclosure, a wireless communication device intending to transmit during the FBE frame may perform a CCA for a COT according to an offset parameter. The offset parameter may be based on the priority level associated with the UE. For example, the offset parameter may include a time period that begins at a start of the FFP. Different UEs may be configured with one or more offset time periods based on one or more priority level(s) associated with the UE. When a first UE is configured with a priority level higher than a second UE, the first UE may have a shorter offset time period that the second UE. When the first UE performs the CCA after the shorter offset time period, the first UE may be more likely to gain the COT than the lower-priority second UE. When the second UE performs the CCA after the longer offset time period, the second UE will be less likely to gain the COT due to the transmission of the first UE causing the CCA of the second UE to fail.

In accordance with the present disclosure, the offset time periods for performing the CCA may be configured based on the priority of the UE. A higher priority UE may be configured with a shorter offset time period compared to a lower priority UE in order to provide the higher priority UE with priority access to the channel. The priority level of the UE may be determined based on one or more aspects associated with the UE. In some instances, the priority level may be determined based on one or more of the data to be transmitted by the UE and/or the type of UE. For example, a UE having data requiring low latency and/or high reliability may be configured with a priority level higher than a UE having data that does not require low latency and/or high reliability. Further, a smartphone may have a lower priority level than a vehicle, while a security device may have a higher priority than a temperature sensor.

Accordingly, techniques described herein can provide priority-based channel access for COTs associated with unlicensed spectrum. More specifically, aspects of the present disclosure provide techniques that enable UEs to use CCA resources associated with floating COTs based on relative priorities between the respective UEs. For example, a UE may be configured to identify a priority level associated with the UE and perform a clear channel assessment for the COT according to an offset parameter. The offset parameter can be based on the priority level associated with the UE. The offset parameter may define a position of the CCA resource within the FFP in the time domain. The UE may subsequently perform a channel access contention procedure for a COT within the FFP based on the CCA resource and may communicate with other UEs and/or BSs during the COT based on gaining use of the COT via the CCA procedure.

In some aspects, a UE may be associated with a semi-static priority level which remains constant from FFP to FFP. In other cases, the channel access priority of the UE may change based on a priority level of data to be transmitted by the UE or other factors. According to some aspects, higher-priority UEs may be configured to select earlier offset positions as compared to lower-priority UEs. By selecting earlier offset positions, techniques described herein may increase the likelihood that the higher-priority UEs may successfully gain the ability to transmit within floating COTs of the unlicensed spectrum. In some aspects, upon gaining use of a COT, a UE and/or a BS may transmit receiver protection signals within offset positions of lower-priority UEs in order to prevent the lower-priority UEs from interfering with communications performed during the COT.

In some instances, access to the channel may be controlled by controlling when the UE performs the LBT. The LBT may be referred to as a clear channel assessment (CCA). For example, an offset time period may determine when the UE performs the CCA. A first UE performing a CCA before a second UE may give the first UE access to the channel. By assigning offset time periods based on a priority level associated with the UE, access to the channel may be based on the priority levels. Accordingly, priority-based access to the channel may yield benefits to the wireless communication system.

In accordance with the present disclosure, controlling access to a COT based on a priority level of the UE may facilitate more efficient use and optimization of the available time and/or frequency resources, lower latency for data transmissions, and/or increase reliability of the wireless communications network. In this regard, prioritizing UE access to the COT based on priority levels may improve access to resources of the unlicensed spectrum, reduce the latency associated with FBE communications, and/or lower the power consumption of UEs and/or BSs in performing FBE communications.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IOT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into transmission time intervals as will be discussed more fully below in relation to FIG. 2. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH). In some instances, the BSs 105 may broadcast the SSBs only in valid candidate SSB positions.

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105.

Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over an unlicensed band, for example, a 6 GHz bands. As discussed above, FCC may regulate maximum EIRP and/or maximum EIRP PSD for transmission in a 6 GHz band. Thus, when the network operates over a 6 GHz channel, a BS 105 may communicate with a UE 115 in accordance with the FCC regulation. The BS 105 may broadcast system information indicating a FBE configuration to facilitate UEs 115 in accessing the network 100 over the unlicensed band.

The FBE configuration may include information associated with offset parameters, priority levels, and locations of CCAs within the FFP. In some aspects, the network 100 may be configured to provide the UEs 115 with access to the channel based on a priority level of the UE 115. The priority level may be based on a priority level of data associated with the UE 115. For example, UE 115 may be a UE that has high priority data to transmit. The high priority data may have requirements for low latency and/or high reliability. For example, data related to safety applications associated with UEs 115*i*, 115*j*, and 115*k* performing vehicle to vehicle communications may require both low latency and high reliability. Data related to financial transactions associated with UE 115*b* may require high reliability. Data related to industrial IoT performed by UEs 115*g* and 115*f* may require low latency. In contrast, data related to content delivery such as voice, video, audio, associated with UEs 115*h* and 115*a* may have more relaxed requirements for latency and reliability as compared to the aforementioned applications that require lower latency and higher reliability.

Figure 2:
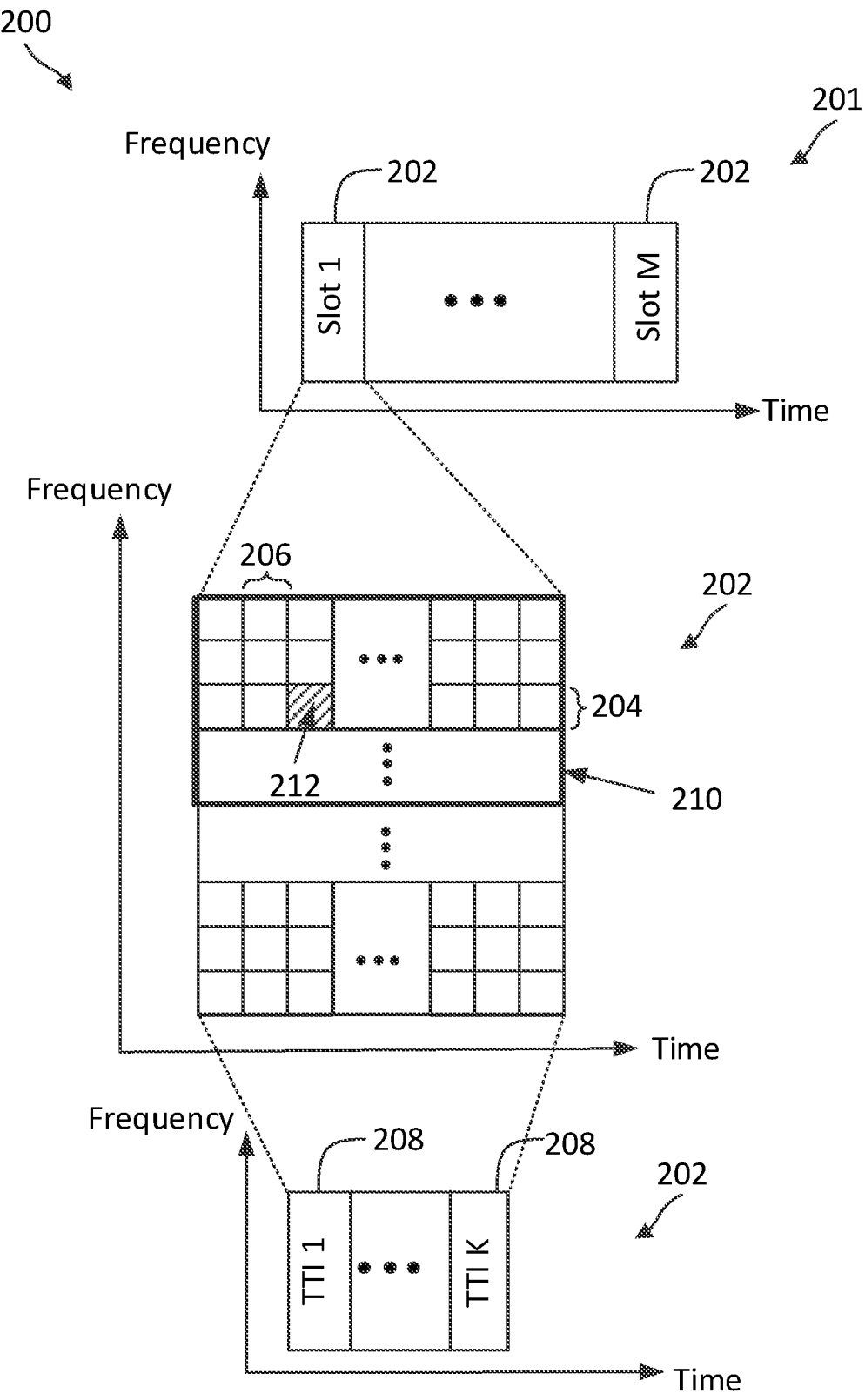
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and one or more consecutive symbols 206 in time. In NR, a RB 210 is defined as twelve consecutive subcarriers 204 in a frequency domain.

In an example, a BS (e.g., BS 105 in FIG. 1) may schedule a UE (e.g., UE 115 in FIG. 1) for UL and/or DL communications at a time-granularity of slots 202 or TTIs 208. Each slot 202 may be time-partitioned into K number of TTIs 208. Each TTI 208 may include one or more symbols 206. The TTIs 208 in a slot 202 may have variable lengths. For example, when a slot 202 includes N number of symbols 206, a TTI 208 may have a length between one symbol 206 and (N−1) symbols 206. In some aspects, a TTI 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
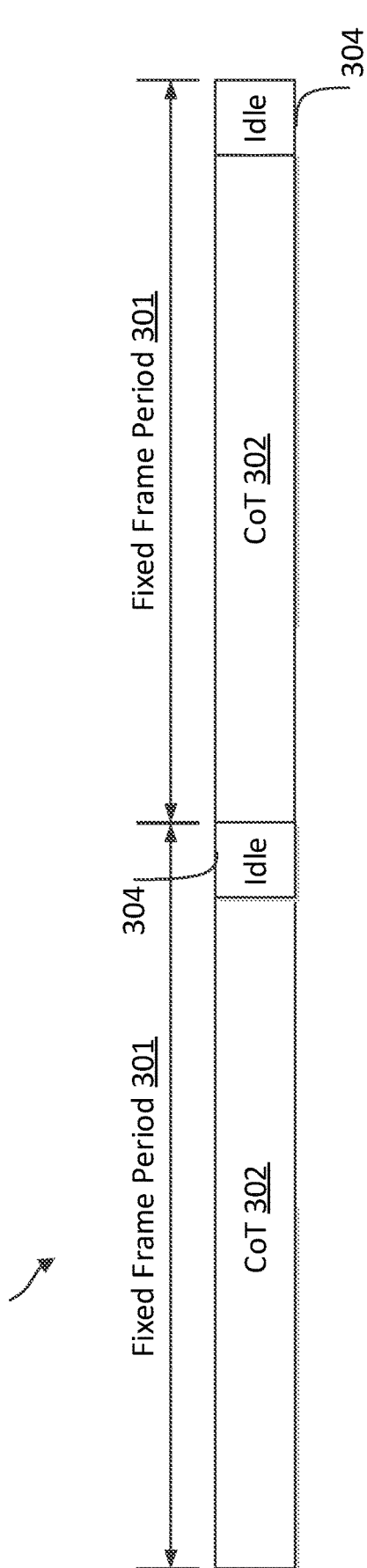
FIG. 3 illustrates a frame-based equipment (FBE) frame structure according to some aspects of the present disclosure.

FIG. 3 illustrates an FBE frame structure 300 according to some aspects of the present disclosure. The frame structure 300 may be employed by BSs such as the BSs 105 and UEs such as the UEs 115 in a network such as the network 100 for communications. In particular, the BS may communicate with the UE in an FBE mode, for example, over a shared radio frequency band in an unlicensed spectrum or shared spectrum, using the frame structure 300. In FIG. 3, the x-axis represents time in some arbitrary units. The frame structure 300 may be employed in conjunction with the structure 200.

As shown, the frame structure 300 includes a plurality of FFPs 301 (e.g., in a shared radio frequency band). Each FFP 301 includes a channel occupancy time (COT) 302 and an idle period 304. The COT 302 may also be referred to as a transmission period. A BS 105 or a UE 115 may perform channel sensing or a CCA in the idle period 304 and may access the frequency during a COT 302 in a subsequent FFP 301. Although FIG. 3 illustrates the idle period 304 located at the end of the FFP 301, it should be understood that in other examples the idle period of an FFP can be located at the beginning of the FFP (e.g., a floating COT). In some aspects, some regulations may restrict the COT 302 to be no longer than 95% of the frame length (the duration of the FFP 301) and the idle period to be no shorter than 5% of the frame length. In some aspects, some regulations may restrict the idle period to be no longer than 100 microseconds (μs).

In some aspects, the BS 105 and/or the UE 115 may perform a CCA in an idle period 304 to gain access to COT 302 in a subsequent FFP 301. As will be described in detail below with reference to FIGS. 5-12, the UE 115 may perform a CCA after an offset time period. The offset time period may be different for different UEs based on priority levels associated with the UEs. For example, a UE may be configured with a short offset time period based on having a high priority. The short offset time period will allow the UE to perform the CCA before a UE having a long offset time period. A first UE performing the CCA before a second UE may allow the first UE to have priority access to the channel over the second UE. After gaining access to the COT 302, the BS 105 and/or the UE 115 may communicate multiple UL and/or DL communications in the COT 302 without another CCA. In some aspects, each FFP 301 is restricted to a duration of about 1 ms, 2 ms, 2.5 ms, 4 ms, 5 ms, 10 ms, or more. The starting positions of the FFPs 301 within every two radio frames (e.g., the radio frames 201) may start from an even radio frame.

The frame structure 300 broadcasted by the BS 105 may be used to perform channel access by the UE 115 at fixed time instants (COT 302). The UE 115 may perform CCA to sense if the channel is available, for example, during idle period 304. If the channel is busy, the UE 115 may back off for the COT 302 and sense the channel again in a next idle period 304 after the COT 302. In some instances, the UE 115 may measure the energy level during COT 302. If the energy level is lower than a threshold and if the UE 115 detected that the channel is idle, the UE 115 may start transmitting data immediately in the COT 302.

Figure 4:
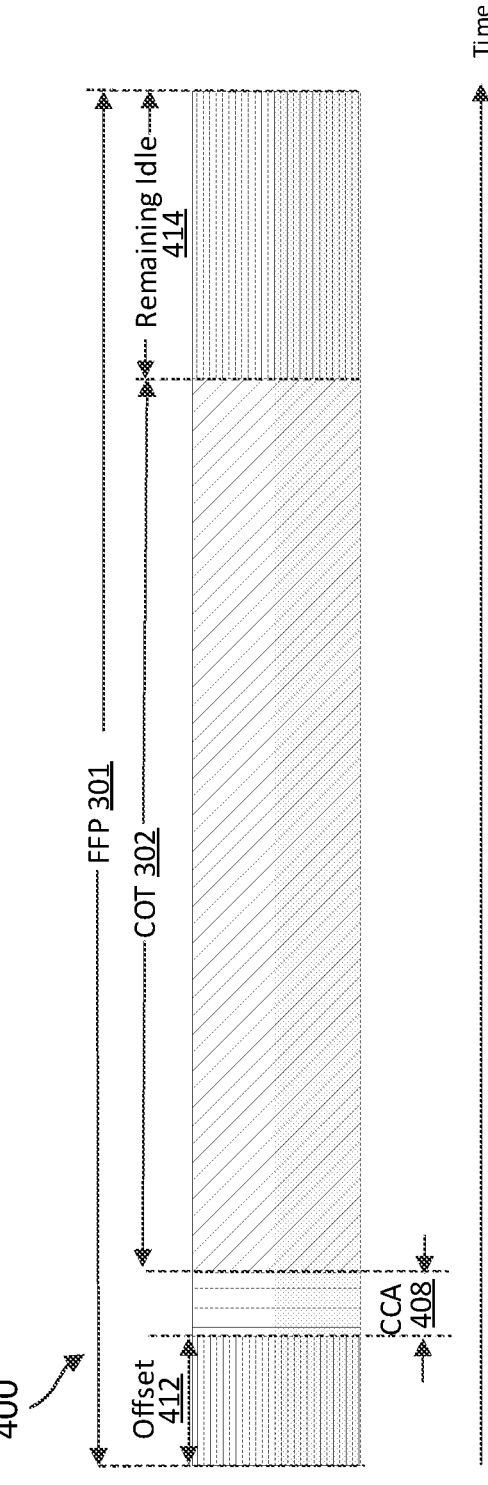
FIG. 4 illustrates an example FBE frame structure according to some aspects of the present disclosure.

FIG. 4 illustrates an example FBE frame structure 400 according to some aspects of the present disclosure. The frame structure 400 may be employed by BSs such as the BSs 105 and UEs such as the UEs 115 in a network such as the network 100 for wireless communications (e.g., NR-U). In particular, the BS may communicate with the UE in an FBE mode, for example, over a shared radio frequency band in an unlicensed spectrum or shared spectrum, using the frame structure 400. In FIG. 4, the x-axis represents time in some arbitrary units. Frame structure 400 may include offset 412 at the beginning of FFP 301. CCA period 408 may begin after offset 412. The offset 412 may be determined based on a priority level associated with the UE. The priority level may be based on a priority level of data associated with the UE. In some aspects, the priority level may be based on a type of UE. In some aspects, the offset 412 may be signaled to the UE. In this regard, the offset 412 may be signaled to the UE in an RRC configuration message.

Because offset 412 may be a variable time period based on a priority of the UE, the start of the CCA period 408 and the start of the COT 302 may vary from one FFP 301 to another FFP 301. That is, each FFP 301 may include a different offset 412. The offset 412 time period may be an idle period. In some aspects, the combined offset 412 at the beginning of FFP 301 and the remaining idle period 414 at the end of the FFP 301 may not exceed the maximum idle period of 100 us or 5% of the FFP 301.

The COT 302 may begin after a successful CCA in the CCA period 408. Since the CCA period 408 may begin at a variable time based on the offset 412, the COT 302 may be considered a floating COT 302. The time at which the COT begins may float within the FFP 301 based on the offset 412. The floating COT 302 may support prioritization of access to the channel by UEs based on the priority level of the UE. For example, a first UE having a shorter offset 412 based on a higher priority may access the channel before a second UE having a longer offset 412 based on a lower priority due to the first UE having the CCA period 408 at an earlier time than the second UE. When the second UE performs the CCA, the channel may be busy (e.g., energy detected above a threshold) due to the first UE transmitting during the floating COT 302. That is, in some instances, a first UE having a higher priority than a second UE may utilize an earlier CCA period 408 than the second UE.

Figure 5:
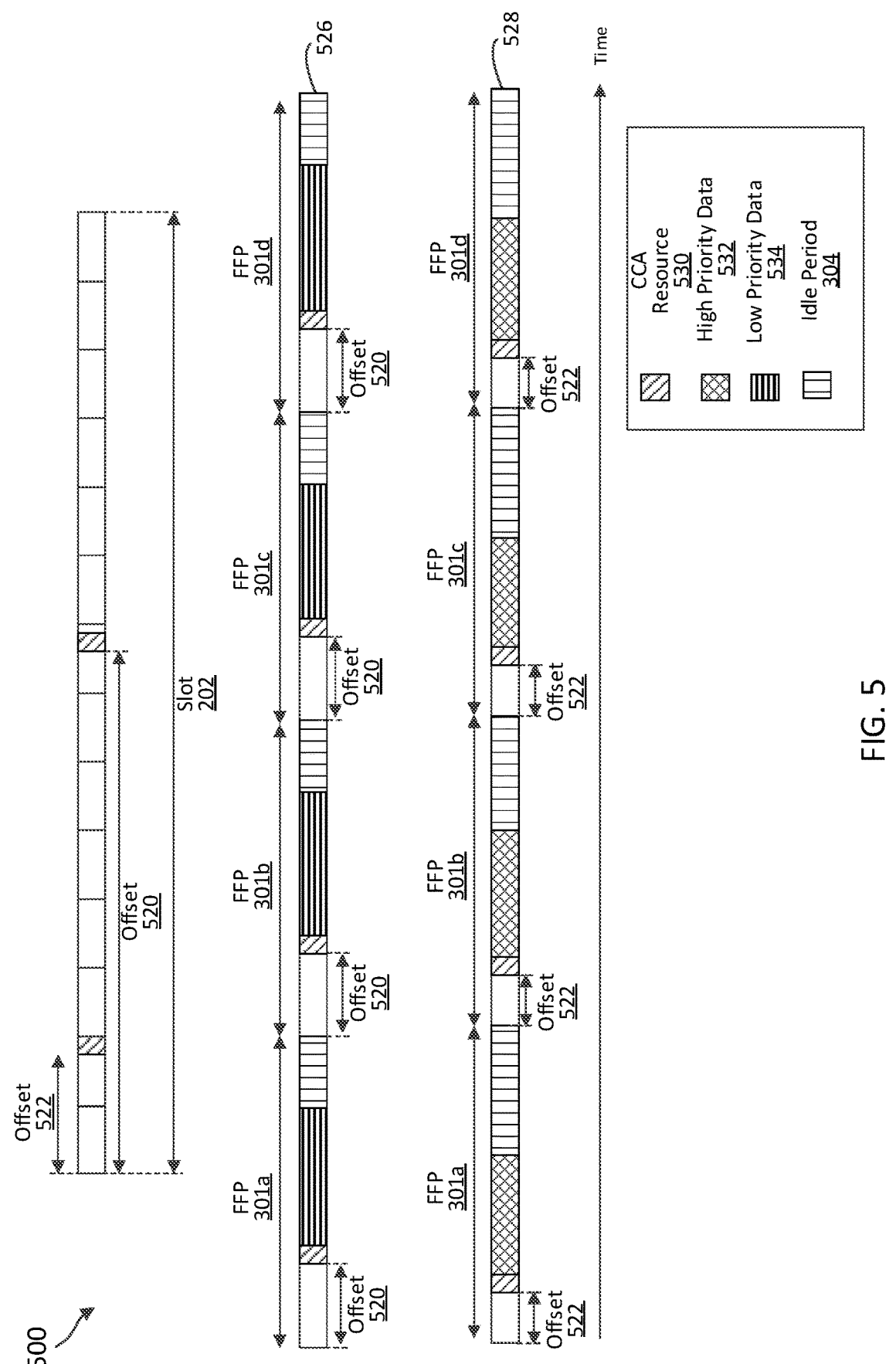
FIG. 5 illustrates offset parameters within FBE frames according to some aspects of the present disclosure.

FIG. 5 illustrates offset parameters within frame structure 500 according to some aspects of the present disclosure. The frame structure 500 may be employed by BSs such as the BSs 105 and UEs such as the UEs 115 in a network such as the network 100 for wireless communications (e.g., NR-U). In particular, the BS may communicate with the UE in an FBE mode over a shared radio frequency band in an unlicensed spectrum or shared spectrum, using the frame structure 500. In FIG. 5, the x-axis represents time in some arbitrary units. Frame structure 500 may be similar to frame structure 400 of FIG. 4. The frame structure 500 may be employed in conjunction with the structure 200. FIG. 5 shows a sequence of four FFPs 301a . . . 301d for two UEs. FFP sequence 526 may be associated with a first UE and FFP sequence 528 may be associated with a second UE. Each FFP 301 of FFP sequence 526 may include an offset 520 followed by CCA resource 530, low priority data 534, and an idle period 304. Each FFP 301 of FFP sequence 528 may include an offset 522 followed by CCA resource 530, high priority data 532, and an idle period 304.

In some aspects, higher-priority UEs may be configured to select earlier CCA resources 530 within a respective FFP 301 as compared to lower-priority UEs. Selection of earlier CCA positions may enable higher-priority UEs to have improved access to floating COTs and therefore improved access to resources of the unlicensed spectrum.

For example, in cases where the second UE determines that it has a higher channel access priority compared to the first UE, the second UE may select a position of the CCA resource 530 within the FFP 301 which is earlier in the time domain relative to a position of the CCA resource 530 which is selected by the first UE. In other words, the second UE may select the CCA resource 530 which is earlier in the time domain relative to the CCA resource 530 of the first UE based on the second UE having a higher channel access priority. By selecting an earlier CCA resource 530, the second UE (e.g., the higher-priority UE) may be able to perform a channel access contention procedure earlier compared to the first UE (e.g., the lower-priority UE), which may give the second UE a higher probability of gaining access to the COT as compared to the first UE.

In some instances, the timing of the CCA resource 530 may be determined by offsets 520 and 522. Offsets 520 and 522 may be determined based on a priority level of data to be transmitted in the COT by the first and second UEs respectively. For example, the second UE may have high priority data 532 to be transmitted in the COT. The first UE may have low priority data 534 to be transmitted in the COT. The second UE may have an earlier offset 522 than offset 520 based on the second UE having higher priority data than the first UE. The earlier offset 522 may mean a shorter time period from the beginning of the FFP 301 to the beginning of the CCA resource 530. Offset 522 occurring earlier in time means that the CCA resource 530 occurs earlier in time providing the second UE with the opportunity to gain the COT if the CCA is successful. Since the CCA resource 530 of the first UE occurs later in time, the CCA contention procedure of the first UE may fail due to the channel being based on the second UE transmitting in the channel. Methods of the present disclosure may enable UEs with higher priority to have a higher probability of gaining access to the respective COTs.

The first UE and the second UE may determine their respective priority level using any method. For example, the priority level may be determined based on a latency budget associated with the data to be transmitted. A lower latency budget may require a higher priority level. The priority level may be determined based on the type of data to be transmitted (e.g., a safety message, sensor measurements, actuator controls, entertainment content, voice, text, authentication, financial data, etc.). In some aspects, the priority level may be determined based on categories of data defined in a standard (e.g., 3GPP standard, SAE standard, IEEE standard, etc.). In some aspects, the priority level may be determined by another node in the communications network (e.g., another UE, a BS, a server, a core network node, etc.). The priority levels may be determined as absolute values. A priority level number may be assigned. In some aspects, the priority levels may be relative to one another. For example, the first UE may have a lower priority level than the second UE, the second UE may have a lower priority level than a third UE, etc.

Offsets 520 and 522 may be based on the priority levels of data to be transmitted by the first and second UE. Offsets 520 and 522 may be time periods determined by processors of the first and second UEs respectively. In some aspects, the UEs may store a lookup table that correlates the offsets 520 and 522 to priority levels of data to be transmitted. The same level of priority may determine a same offset. Offsets 520 and 522 may be set as time periods with a slot 202. In some aspects, offsets 520 and 522 may have a time granularity of a symbol within a slot 202. The offsets 520 and 522 may be located according to the symbol index within the slot 202. For example, as shown in FIG. 5, offset 522 may be located within the second symbol of the slot 202. Offset 520 may be located within the eighth symbol of the slot 202.

In some cases where the channel access priority of the UEs is determined semi-statically (e.g., semi-static channel access priority scheme), the selected position of the CCA resources 530 may be applicable for the FFP sequences 526 and 528. In this regard, the selected position of CCA resources 530 associated with the first UE may be the same across each FFP 301a . . . 301d. Similarly, the selected position of CCA resources 530 associated with the second UE may be the same across each FFP 301a . . . 301d. In some aspects, assigning priority levels to UEs based on the data to be transmitted may facilitate a more robust network that matches latency and/or reliability to the type of data to be transmitted.

Figure 6:
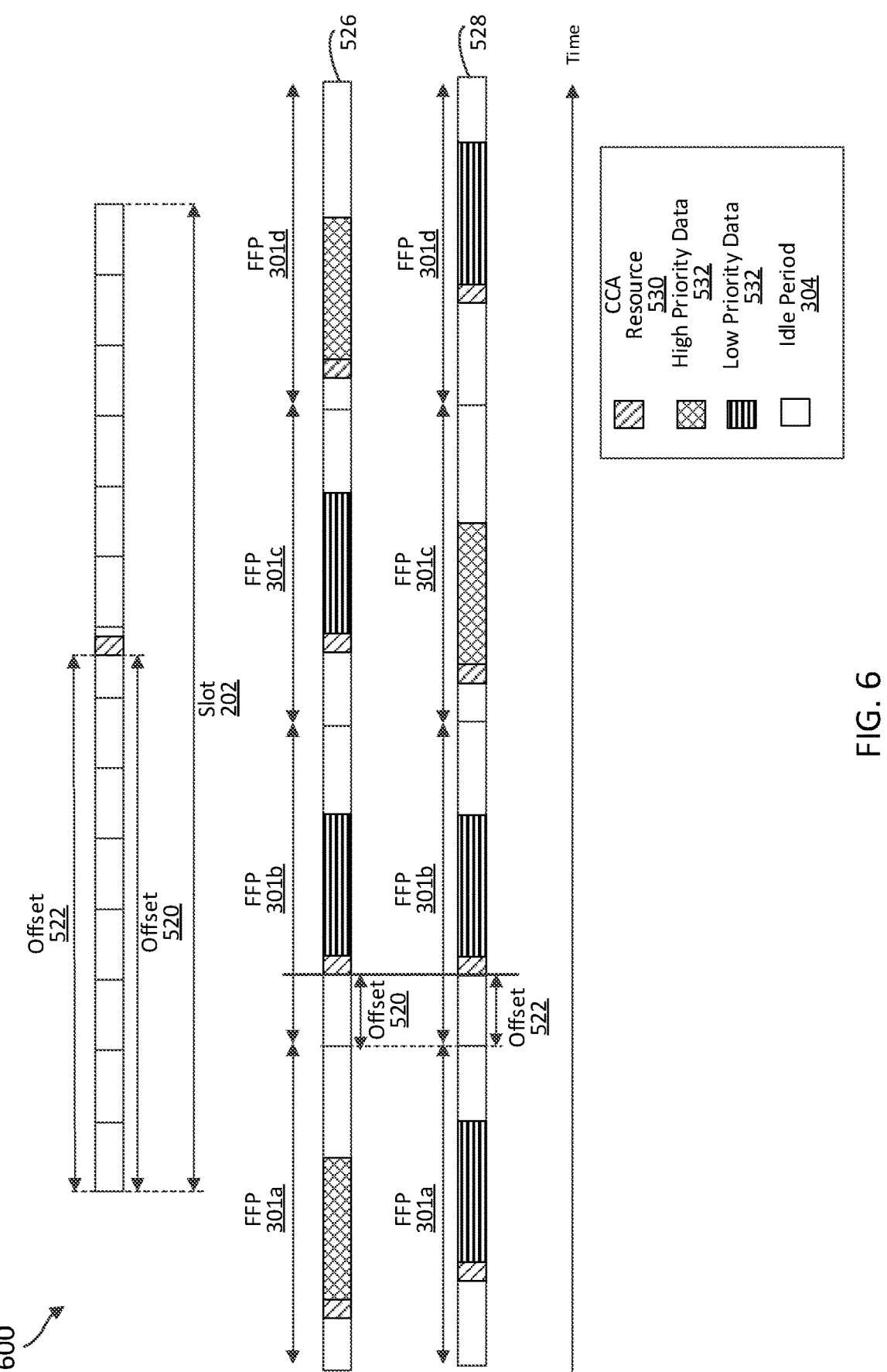
FIG. 6 illustrates equal offset parameters within FBE frames according to some aspects of the present disclosure.

FIG. 6 illustrates offset parameters within frame structure 600 according to some aspects of the present disclosure. The frame structure 600 may be employed by BSs such as the BSs 105 and UEs such as the UEs 115 in a network such as the network 100 for wireless communications (e.g., NR-U). In particular, the BS may communicate with the UE in an FBE mode, for example, over a shared radio frequency band in an unlicensed spectrum or shared spectrum, using the frame structure 600. In FIG. 6, the x-axis represents time in some arbitrary units. Frame structure 600 may be similar to frame structure 400 of FIG. 4. The frame structure 600 may be employed in conjunction with the structure 200. FIG. 6 shows a sequence of four FFPs 301a . . . 301d for two UEs. FFP sequence 526 may be associated with a first UE and FFP sequence 528 may be associated with a second UE. Each FFP 301 of FFP sequence 526 may include an offset 520 followed by CCA resource 530, low priority data 534 and/or high priority data 532, and an idle period 304. Each FFP 301 of FFP sequence 528 may include an offset 522 followed by CCA resource 530, low priority data 534 and/or high priority data 532, and an idle period 304. In contrast to the example of FIG. 5 in which each of the FFPs 301 had the same priority of data in a semi-static configuration, in the example of FIG. 6, each of the FFPs 301 may have a different level of priority for the data. The configuration in which the priority level of the data may change in each FFP 301 may be considered a dynamic channel access priority scheme.

In a dynamic channel access priority scheme, the UEs may each be associated with a "dynamic" channel access priority which may change from one FFP 301 to another. In particular, under a dynamic channel access priority scheme, the relative channel access priorities associated with the UEs may be based on a relative priority of data to be transmitted by the respective UEs within a given FFP 301. The priority levels may indicate a relative priority or importance of individual transport blocks or messages which are scheduled to be transmitted.

In some aspects, UEs with higher priority data to be transmitted may be configured to select earlier CCA resources 530 within a respective FFP 301 as compared to UEs with lower priority data to be transmitted. Selection of earlier positions of CCA resources 530 may enable UEs with higher priority data to have improved access to floating COTs and therefore improved access to resources of the unlicensed spectrum.

FIG. 6 shows an example dynamic configuration in which the priority level of data to be transmitted by UEs may change from FFP 301 to FFP 301. For example, as shown in FFP sequence 526, a first UE may have high priority data to be transmitted in FFPs 301a and 301d. The first UE may also have low priority data to be transmitted in FFPs 301b and 301c. Similarly, as shown in FFP sequence 528, a second UE may have high priority data to be transmitted in FFP 301c. The second UE may also have low priority data to be transmitted in FFPs 301a, 301b, and 301d. In some aspects, a dynamic channel access priority scheme may enable offsets 520 and 522 to be set based on the level of priority associated with the data to be transmitted in the individual FFP 301. The offsets 520 and 522 may be set based on priority levels as described above with reference to FIG. 5. In some cases, both the first and second UEs may have data with the same level of priority to be transmitted. For example, in FFP 301b, the first and second UEs have data with a low level of priority to be transmitted. In this case, offsets 520 and 522 may have the same value causing the first and second UEs to contend for the COT at the same time. In order to provide controlled access to the COT in the case of the UEs having the same priority level, a finer granularity of the offsets 520 and 522 may reduce the probability of the first and second UEs contending for the COT at the same time. An example of a finer granularity of the offsets 520 and 522 is presented with reference to FIG. 7 below.

Figure 7:
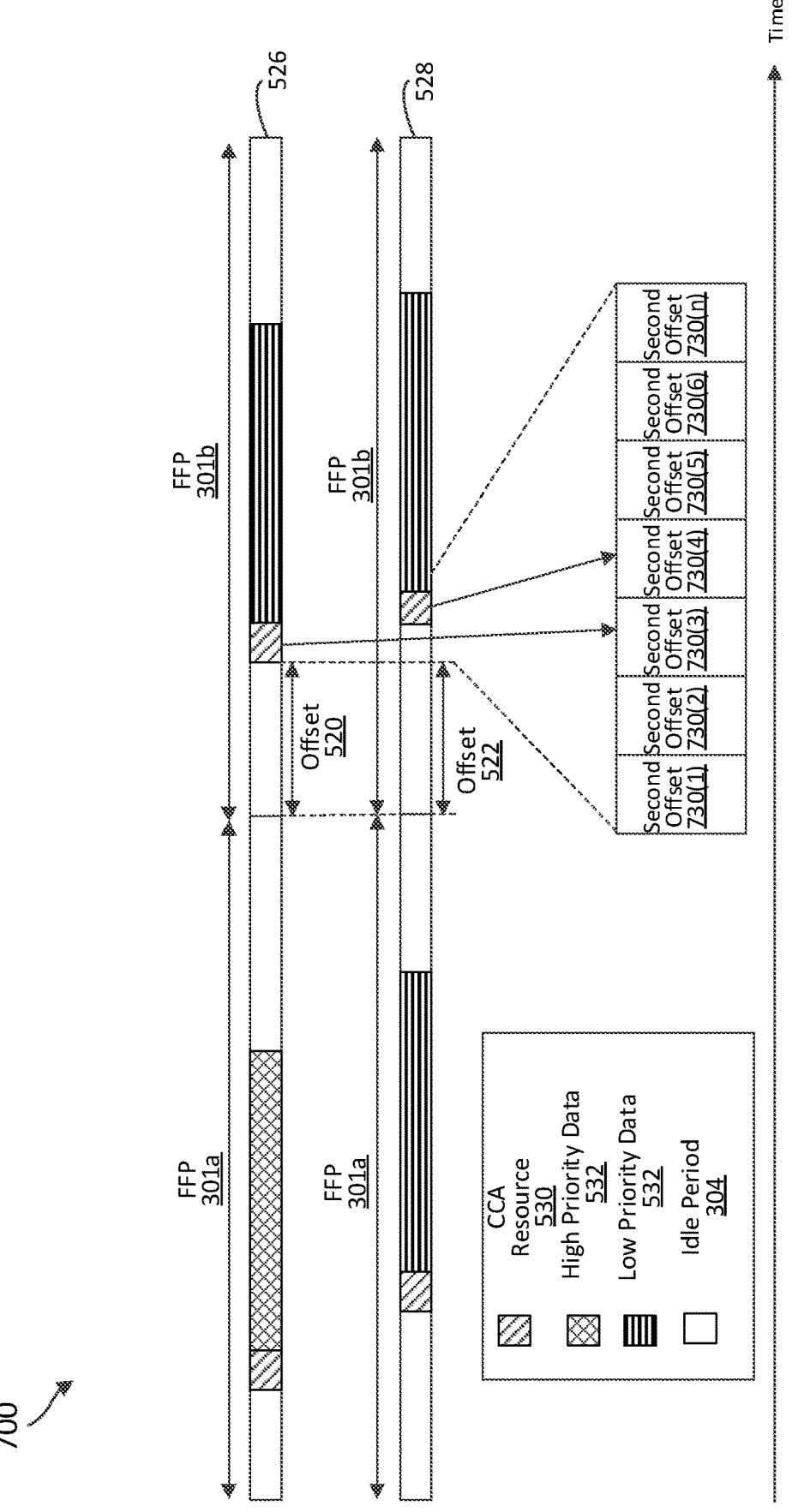
FIG. 7 illustrates a set of additional offset parameters within FBE frames according to some aspects of the present disclosure.

FIG. 7 illustrates a set of additional offset parameters within frame structure 700 according to some aspects of the present disclosure. The frame structure 700 may be employed by BSs such as the BSs 105 and UEs such as the UEs 115 in a network such as the network 100 for wireless communications (e.g., NR-U). In particular, the BS may communicate with the UE in an FBE mode, for example, over a shared radio frequency band in an unlicensed spectrum or shared spectrum, using the frame structure 700. In FIG. 7, the x-axis represents time in some arbitrary units. Frame structure 700 may be similar to frame structure 400 of FIG. 4. The frame structure 700 may be employed in conjunction with the structure 200. FIG. 7 shows a sequence of two FFPs 301a and 301b for two UEs. FFP sequence 526 may be associated with a first UE and FFP sequence 528 may be associated with a second UE. Each of FFP 301a and 301b of FFP sequence 526 may include an offset 520 followed by CCA resource 530, low priority data 534 and/or high priority data 532, and an idle period 304. Similarly, each FFP 301a and 301b of FFP sequence 528 may include an offset 522 followed by CCA resource 530, low priority data 534 and/or high priority data 532, and an idle period 304. In contrast to the example of FIG. 6 in which the location of the CCA resource 530 that followed offset 520 had the same location as the CCA resource 530 that followed offset 522, in the example of FIG. 7, the CCA resource 530 may be located after a second offset 730 that may follow offset 520 or 522. In other words, the CCA resource 530 may be located at a position based on two sequential offsets. The second offset 730 may follow offset 520/522. The second offset may have a finer granularity in time such that the probability of the CCA resource 530 being located in the same position for multiple UEs is reduced. For example, the offset 520/522 may be located on a symbol boundary basis. The offset 520/522 may be indicated by a symbol index (e.g., a symbol index between 0 and 13). Whereas the second offset 730 may have a finer granularity in time. In some aspects, each symbol may be divided into second offsets 730(1) . . . 730(n). For example, the second offset 730 may have a time period equal to the time period of the CCA resource 530. In some aspects, the second offset 730 may have a time period of about 9 microseconds.

In order to reduce interference during the COT contention procedure, when the first UE and the second UE have data for transmission with the same level of priority, the UEs may be configured with the CCA resource 530 after a time period comprising offset 520/522 followed by second offset 730. As shown in FIG. 7, in FFP sequence 526, the CCA resource 530 in FFP 301b may be scheduled after expiration of offset 520 followed by expiration of second offset 730(3). Similarly, in FFP sequence 528, the CCA resource 530 in FFP 301b may be scheduled after expiration of offset 522 followed by expiration of second offset 730(4). In this case, the first UE may have priority for the COT over the second UE since the second offset 730(3) occurs earlier in time than the second offset 730(4).

In some aspects, the index of the second offset may be chosen at random. For example, the UE may choose the index of second offset 730(1) . . . 730(n) randomly. In some aspects, a BS in communication with the UE may select the offset 520/522 and/or the second offset 730(1) . . . 730(n). The BS may have knowledge of the relative priorities of the data to be transmitted by the UEs and may assign the offset 520/522 and/or the second offset 730(1) . . . 730(n) based on the relative priorities. In this regards, the offset 520/522 and/or the second offset 730(1) . . . 730(n) may be transmitted to the UEs via an RRC configuration and/or via downlink control information. In the cases in which the UEs have the same priority of data to be transmitted, the BS may assign the UEs with the offset 520/522 and/or the second offset 730(1) . . . 730(n) in a coordinated fashion such that the CCA resource 530 of the UEs are not assigned the same location.

Figure 8:
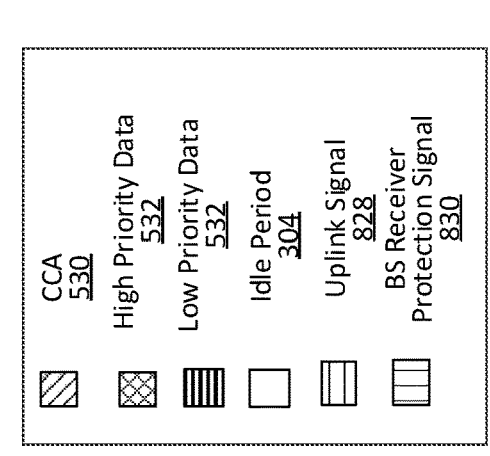
FIG. 8 illustrates an example receiver protection signal within a CCA period according to some aspects of the present disclosure.

FIG. 8 illustrates an example receiver protection signal within a CCA period according to some aspects of the present disclosure. In FIG. 8, the frame structure 800 may be employed by BSs such as the BSs 105 and UEs such as the UEs 115 in a network such as the network 100 for wireless communications (e.g., NR-U). In particular, the BS may communicate with the UE in an FBE mode, for example, over a shared radio frequency band in an unlicensed spectrum or shared spectrum, using the frame structure 800. In FIG. 8, the x-axis represents time in some arbitrary units. Frame structure 800 may be similar to frame structure 400 of FIG. 4. The frame structure 800 may be employed in conjunction with the structure 200. FIG. 8 shows a sequence of two FFPs 301a and 301b for two UEs. FFP sequence 526 may include FFPs 301a and 301b and may be associated with a first UE. FFP sequence 528 may include FFPs 301a and 301b and may be associated with a second UE. Each FFP 301 of FFP sequence 526 may include an offset 520 followed by CCA resource 530, low priority data 534 and/or high priority data 532, and an idle period 304. Each FFP 301 of FFP sequence 528 may include an offset 522 followed by CCA resource 530, low priority data 534 and/or high priority data 532, and an idle period 304. In contrast to the example of FIG. 5 in which each of the FFPs had the same priority level of data in a semi-static configuration, in the example of FIG. 8, each of the FFPs 301 may be dynamically configured to have a different level of priority for the data to be transmitted.

In some aspects, a BS (e.g., BS 105 or BS 1100) may transmit a receiver protection signal 830 in order to prevent the first UE associated with FFP sequence 526 from interfering with communications performed during the COT by the second UE associated with FFP sequence 528. In particular, a BS may transmit a receiver protection signal 830 during CCA resources 530 of the lower-priority UE in order to prevent the lower priority UE from successfully performing a channel access contention procedure within the CCA resource 530.

For example, referring to FIG. 8, in FFP 301a, the second UE associated with FFP sequence 528 may have a higher channel access priority as compared to first UE associated with FFP sequence 526. As such, the second UE may perform a channel access contention procedure within a CCA resource 530 of the FFP 310a to gain access to a COT within the FFP 310a. After a successful CCA, the second UE may transmit an uplink signal 828 to the BS indicating that the second UE has gained access to the COT. In this regard, the signal may be an uplink signal indicating that the second UE has gained access to a COT. In some instances, the uplink signal may include a control message received by the BS over a physical uplink shared channel (PUSCH) and/or a physical uplink control channel (PUCCH). For example, the uplink signal may be an information element included in a control message. The control message may be a specific message indicating that the second UE has gained access to a COT. In some aspects, the control message may be a binary indicator indicating that the second UE has gained access to a COT. In some aspects, the uplink signal indicating that the second UE has gained access to a COT may be included in a reference signal.

In this example, the BS may determine a set of time/frequency resources associated with a CCA resource 530 of the first UE within the FFP 310a based on receiving the uplink signal 828 from the second UE. The BS may transmit a receiver protection signal 830 within a set of resources which at least partially overlap with the CCA resource 530 of the first UE in the time domain and/or the frequency domain. As such, the BS may transmit the receiver protection signal 830 in order to prevent the first UE from successfully performing a channel access contention procedure within the CCA resource 530 of the FFP 310a. The receiver protection signal 830 may be configured to cause the CCA of the first UE to fail. The receiver protection signal 830 may be any type of signal that may cause the CCA of the first UE to fail. For example, the receiver protection signal 830 may include a reference signal, sounding reference signal, and/or other signal (s). The receiver protection signal 830 may include a PDCCH and/or a PDSCH and/or other signal (s).

Figure 9:
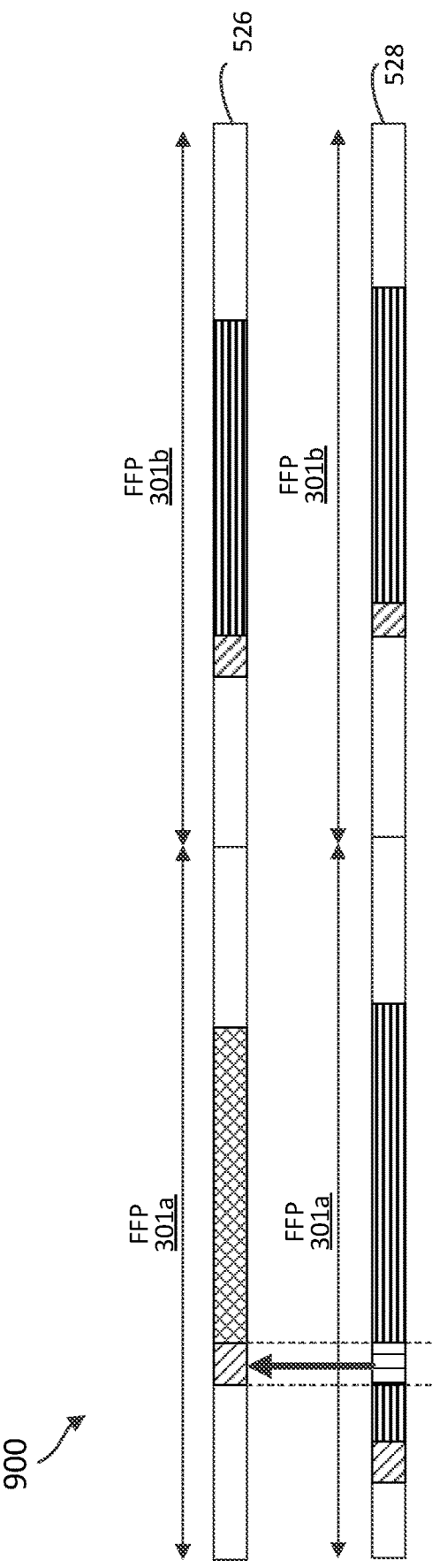
FIG. 9 illustrates another example receiver protection signal within a CCA period according to some aspects of the present disclosure.
Figure 9:
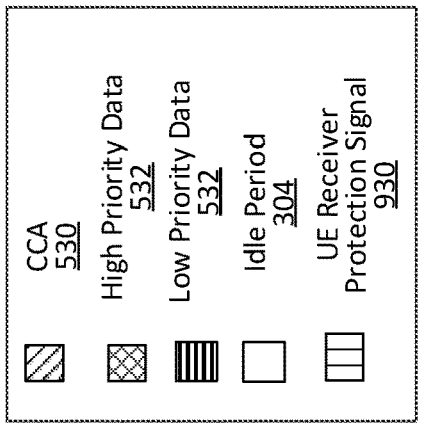

FIG. 9 illustrates an example receiver protection signal within a CCA period according to some aspects of the present disclosure. In FIG. 9, the frame structure 900 may be employed by BSs such as the BSs 105 and UEs such as the UEs 115 in a network such as the network 100 for wireless communications (e.g., NR-U). In particular, the BS may communicate with the UE in an FBE mode, for example, over a shared radio frequency band in an unlicensed spectrum or shared spectrum, using the frame structure 900. In FIG. 9, the x-axis represents time in some arbitrary units. Frame structure 900 may be similar to frame structure 400 of FIG. 4. The frame structure 900 may be employed in conjunction with the structure 200. FIG. 9 shows a sequence of two FFPs 301a and 301b for two UEs. FFP sequence 526 may include FFPs 301a and 301b and be associated with a first UE. FFP sequence 528 may include FFPs 301a and 301b and be associated with a second UE. Each FFP 301 of FFP sequence 526 may include an offset 520 followed by CCA resource 530, low priority data 534 and/or high priority data 532, and an idle period 304. Each FFP 301 of FFP sequence 528 may include an offset 522 followed by CCA resource 530, low priority data 534 and/or high priority data 532, and an idle period 304. In contrast to the example of FIG. 8 in which the BS transmits a receiver protection signal 830 during the CCA resource 530 of the lower priority UE, in FIG. 9, the higher priority UE may transmit a receiver protection signal 930 that is configured to cause the clear channel assessment of the lower priority UE to fail.

In some aspects, the second UE associated with FFP sequence 528 may transmit a receiver protection signal 930 in order to prevent the first UE associated with FFP sequence 526 from interfering with communications performed by the second UE during the COT. In particular, the second UE (the higher priority UE) may be configured to transmit receiver protection signals 930 during CCA resources 530 of the first UE (the lower priority UE) in order to prevent the lower priority UE from successfully performing a channel access contention procedure within the CCA resource 530. FIG. 8 shows the UE having low priority data scheduled for transmission within the COT during the same time as the high priority data, however only the high priority data may actually be transmitted after the high priority UE gains the COT.

For example, referring to FIG. 9, the second UE associated with FFP sequence 528 may have a higher channel access priority as compared to first UE associated with FFP sequence 526. As such, the second UE may perform a channel access contention procedure within a CCA resource 530 of the FFP 310*a* to gain access to a COT within the FFP 310*a*. In this example, the second UE may receive from a BS an indication of one or more time/frequency resources associated with the CCA resource 530 of the first UE within the FFP 310*a*. The BS may transmit a downlink message (e.g., control signaling, RRC message, DCI message, MAC-CE) to the second UE that indicates the one or more time/frequency resources associated with the CCA resource 530 of the first UE within the FFP 310*a*. The second UE may transmit the receiver protection signal 930 within one or more resources that at least partially overlap with the time/frequency resources associated with the CCA resource 530 of the first UE. As such, the second UE may transmit the receiver protection signal 930 in order to prevent the first UE from successfully performing a channel access contention procedure within the FFP 310*a*. The receiver protection signal 930 may be configured to cause the channel contention procedure of the first UE to fail. The receiver protection signal 930 may be any type of signal that may cause the CCA of the first UE to fail. For example, the receiver protection signal 930 may include a reference signal, sounding reference signal, and/or other signal(s).

Figure 10:
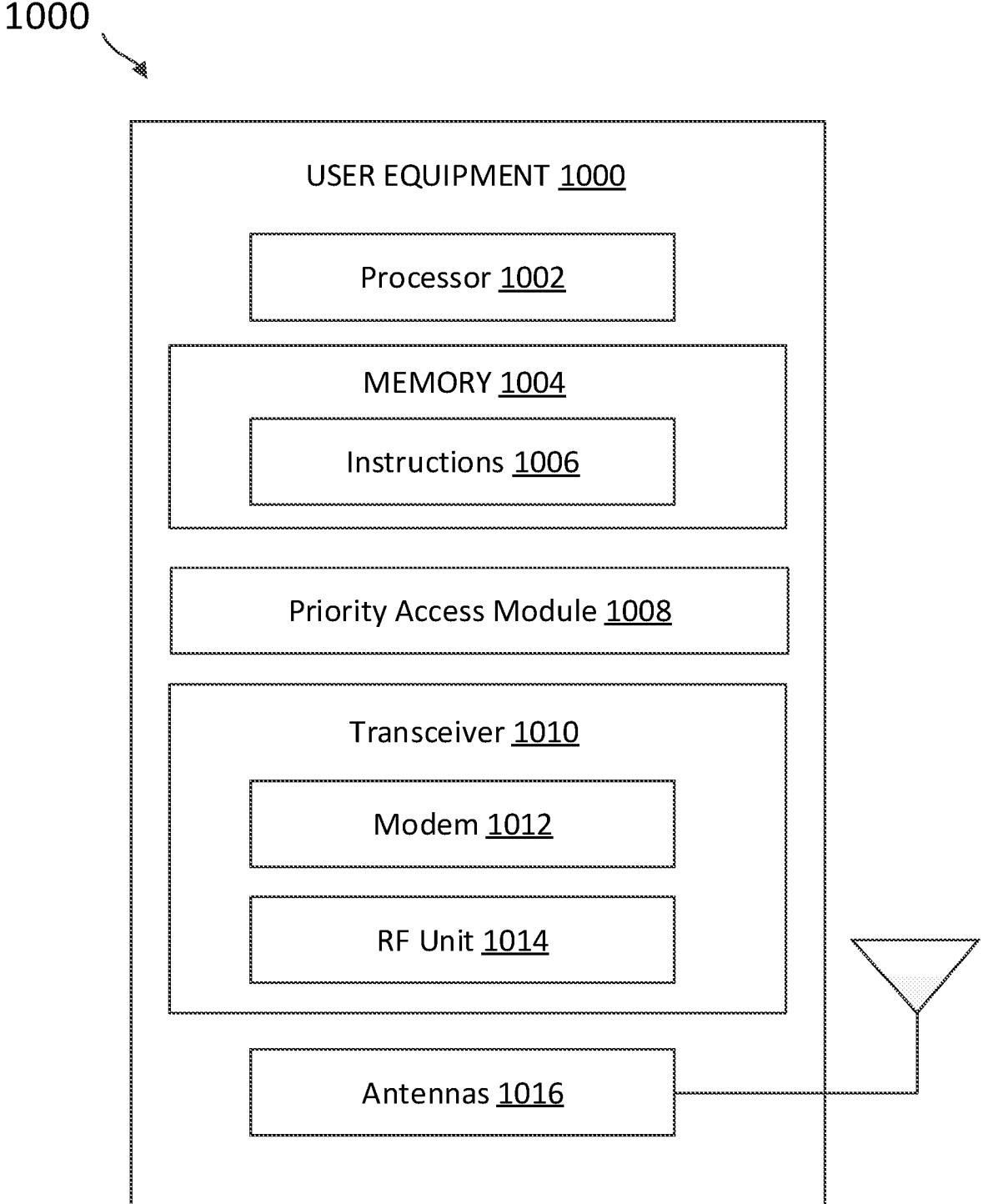
FIG. 10 is a block diagram of an exemplary user equipment (UE) according to some aspects of the present disclosure.

FIG. 10 is a block diagram of an exemplary UE 1000 according to some aspects of the present disclosure. The UE 1000 may be a UE 115 in the network 100 as discussed above in FIG. 1. As shown, the UE 1000 may include a processor 1002, a memory 1004, a priority access module 1008, a transceiver 1010 including a modem subsystem 1012 and a RF unit 1014, and one or more antennas 1016. These elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 2-9 and 12-13. Instructions 1006 may also be referred to as program code. The program code may be for causing a wireless communication device to perform these operations, for example by causing one or more processors (such as processor 1002) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The priority access module 1008 may be implemented via hardware, software, or combinations thereof. For example, the priority access module 1008 may be implemented as a processor, circuit, and/or instructions 1006 stored in the memory 1004 and executed by the processor 1002. In some instances, the priority access module 1008 can be integrated within the modem subsystem 1012. For example, the priority access module 1008 can be implemented by a combination of software components (e.g., executed by a DSP or a general processor) and hardware components (e.g., logic gates and circuitry) within the modem subsystem 1012.

The priority access module 1008 may communicate with various components of the UE 1000 to implement various aspects of the present disclosure, for example, aspects of FIGS. 2-9 and 12-13. In some aspects, the priority access module 1008 is configured to cause the UE 1000 to identify a priority level associated with the UE 1000. In this regard, the processor 1002 may identify the priority level of the UE 1000 based on a priority level of data associated with the UE 1000. For example, the processor 1002 may identify the priority level of data stored in the memory 1004 that is scheduled to be transmitted. In some aspects, the processor 1002 may identify the priority level of the UE 1000 based on a type of the UE 1000.

In some aspects, the priority access module 1008 is configured to cause the UE 1000 to perform a clear channel assessment for a COT according to an offset parameter, wherein the offset parameter is based on the priority level associated with the UE 1000. In this regard, the transceiver 1010 may be configured to perform a clear channel assessment for a COT. The transceiver 1010 may perform a listen before talk procedure for the CCA by sensing the energy in the communication channel to determine whether the energy is less than a threshold. The transceiver 1010 may be configured to perform the CCA after an offset time period. The offset time period may be based on the priority level of the data to be transmitted.

In some aspects, the transceiver 1010 may be configured to receive, from a base station (BS), multiple offset parameters, wherein each offset parameter is associated with a priority level of data to be transmitted by the transceiver 1010.

In some aspects, the transceiver 1010 may be configured to transmit a receiver protection signal during a time period associated with a CCA of a second UE. The UE 1000 may receive, from a base station (BS), an indicator that indicates a location of the CCA of the second UE. For example, the UE 1000 may receive, from the BS, time and/or frequency resources associated with the CCA of the second UE. The transceiver 1010 may transmit the receiver protection signal configured to interfere with the CCA of the second UE thereby causing the CCA to fail.

As shown, the transceiver 1010 may include the modem subsystem 1012 and the RF unit 1014. The transceiver 1010 can be configured to communicate bi-directionally with other devices, such as the BSs 105 and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., RRC configuration, PRACH configurations, PDCCH signals, SSB, PDSCH signals, UL data) from the modem subsystem 1012 (on outbound transmissions) or of transmissions originating from another source such as a BS 105. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the UE 1000 to enable the UE 1000 to communicate with other devices.

The RF unit 1014 may provide the modulated and/or processed data, e.g. data packets (or, more generally, data messages that may contain one or more data packets and other information), to the antennas 1016 for transmission to one or more other devices. This may include, for example, transmission of information to complete attachment to a network and communication with a BS 105 according to some aspects of the present disclosure. The antennas 1016 may further receive data messages transmitted from other devices and provide the received data messages for processing and/or demodulation at the transceiver 1010. The transceiver 1010 may provide the demodulated and decoded data (e.g., PUSCH signals, PUCCH signals, SSB, PRACH, BCH, reference signals, etc.) to the priority access module 1008 for processing. The antennas 1016 may include multiple antennas of similar or different designs in order to sustain multiple transmission links.

In an aspect, the UE 1000 can include multiple transceivers 1010 implementing different RATs (e.g., NR and LTE). In an aspect, the UE 1000 can include a single transceiver 1010 implementing multiple RATs (e.g., NR and LTE). In an aspect, the transceiver 1010 can include various components, where different combinations of components can implement different RATs.

Figure 11:
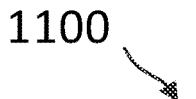
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 as discussed above with respect to FIG. 1. As shown, the BS 1100 may include a processor 1102, a memory 1104, a priority access module 1108, a transceiver 1110 including a modem subsystem 1112 and a radio frequency (RF) unit 1114, and one or more antennas 1116. These elements may be in direct or indirect communication with each other, for example via one or more buses.

The processor 1102 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1104 includes a non-transitory computer-readable medium. The memory 1104 may store, or have recorded thereon, instructions 1106. The instructions 1106 may include instructions that, when executed by the processor 1102, cause the processor 1102 to perform the operations described herein with reference to the BSs 105 in connection with aspects of the present disclosure, for example, aspects of FIGS. 2-9 and 12-13. Instructions 1106 may also be referred to as program code, which may be interpreted broadly to include any type of computer-readable statement(s) as discussed above with respect to FIG. 10.

The priority access module 1108 may be implemented via hardware, software, or combinations thereof. For example, the priority access module 1108 may be implemented as a processor, circuit, and/or instructions 1106 stored in the memory 1104 and executed by the processor 1102. In some instances, the priority access module 1108 can be integrated within the modem subsystem 1112. For example, the priority access module 1108 can be implemented by a combination of software components (e.g., executed by a DSP or a general processor) and hardware components (e.g., logic gates and circuitry) within the modem subsystem 1112.

The priority access module 1108 may communicate with various components of the BS 1100 to implement various aspects of the present disclosure, for example, aspects of FIGS. 2-9 and 12-13. In some aspects, the priority access module 1108 is configured to cause the BS 1100 to receive, from a UE (e.g., UE 115, UE 1000), a signal. In this regard, the transceiver 1110 may be configured to receive the signal from the UE. The signal may be a message from a high priority UE indicating that the UE has gained the COT. In response to receiving the signal indicating that the high priory UE has gained the COT, the transceiver 1110 may transmit, based on receiving the signal and based on a priority level associated with the UE being higher than a priority level associated with a second UE, a receiver protection signal during a time period associated with a CCA of the second UE. The transceiver 1110 may configure the receiver protection signal to cause the CCA of the second UE to fail in order to prevent the second UE from transmitting in the COT gained by the high priority UE thereby reducing interference to the high priority UEs transmission in the COT.

In some aspects, the priority access module 1108 is configured to cause the BS 1100 to transmit, to a UE (e.g., UE 115, UE 1000) multiple offset parameters, wherein the multiple offset parameters are based on a priority level of data associated with the UE. In this regard, the transceiver 1110 may be configured to transmit the offset parameters to the UEs. The offset parameters may be configured as time period offsets from the beginning of an FFP to the start of a CCA. The time period offsets may enable the UEs to have prioritized access to the channel based on a level of priority associated with data to be transmitted by the UEs.

As shown, the transceiver 1110 may include the modem subsystem 1112 and the RF unit 1114. The transceiver 1110 can be configured to communicate bi-directionally with other devices, such as the UEs 115 and 1000. The modem subsystem 1112 may be configured to modulate and/or encode the data from the memory 1104 and/or the priority access module 1108 according to a modulation and coding scheme (MCS), e.g., a low-density parity check (LDPC) coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., PUSCH signals, PUCCH signals) from the modem subsystem 1112 (on outbound transmissions) or of transmissions originating from another source such as a UE 115 or a BS 105. The RF unit 1114 may be further configured to perform analog beamforming in conjunction with the digital beamforming. Although shown as integrated together in transceiver 1110, the modem sub-system 1112 and the RF unit 1114 may be separate devices that are coupled together at the BS 105 or 1100 to enable the BS 105 or 1100 to communicate with other devices.

The RF unit 1114 may provide the modulated and/or processed data, e.g. data packets (or, more generally, data messages that may include one or more data packets and other information), to the antennas 1116 for transmission to one or more other devices. The antennas 1116 may further receive data messages transmitted from other devices. The antennas 1116 may provide the received data messages for processing and/or demodulation at the transceiver 1110. The transceiver 1110 may provide the demodulated and decoded data (e.g., RRC configuration, PRACH configurations, PDCCH signals, SIB, PDSCH signals, BCH Signals, DL data) to the priority access module 1108 for processing. The antennas 1116 may include multiple antennas of similar or different designs in order to sustain multiple transmission links. The RF unit 1114 may configure the antennas 1116.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
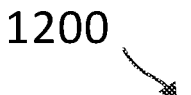
FIG. 12 is a flow diagram of a wireless communication method according to some aspects of the present disclosure.
Figure 12:
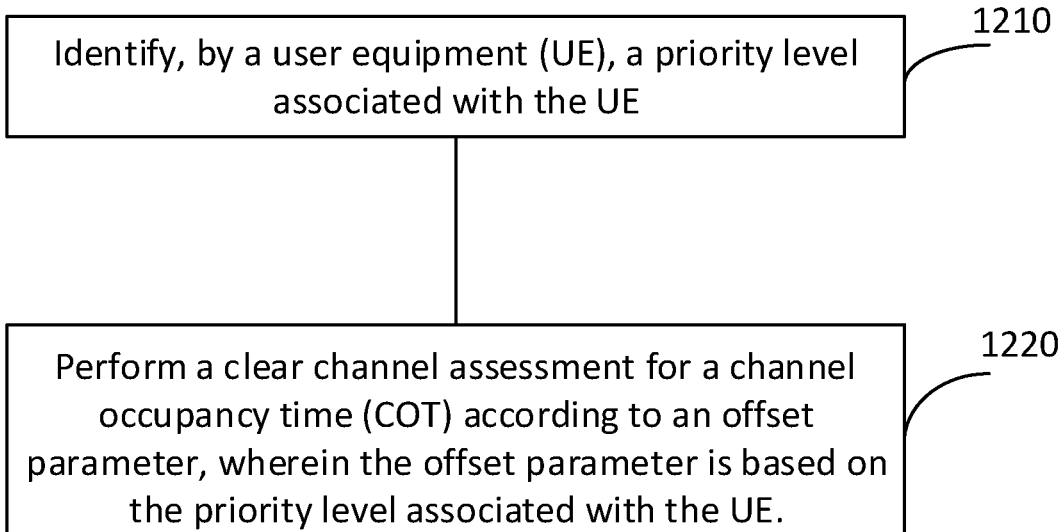

FIG. 12 is a flow diagram of a wireless communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as a UE 115 or the UE 1000, may utilize one or more components, such as the processor 1002, the memory 1004, the priority access module 1008, the transceiver 1010, the modem 1012, and the one or more antennas 1016, to execute the steps of method 1200.

The method 1200 may employ similar mechanisms as described above with reference to FIGS. 2-9. As illustrated, the method 1200 includes a number of enumerated steps, but aspects of the method 1200 may include additional steps before, after, and in between the enumerated steps. In some aspects, one or more of the enumerated steps may be omitted or performed in a different order.

At 1210, a UE (e.g., the UE 115 or the UE 1000) identifies a priority level associated with the UE. In this regard, the UE may identify the priority level of the UE based on any aspect associated with the UE. In this regard, the UE may determine the priority level based on the priority level of the data to be transmitted by the UE. A UE having data requiring low latency and/or high reliability may have a priority level higher than a UE having data that does not require low latency and/or high reliability.

In some aspects, the UE may identify the priority level by identifying a priority level from a plurality of priority levels available to the UE. In some aspects, the UE may determine the priority level based on the type of UE. For example, a smartphone may have a lower priority level than a vehicle. A security device may have a higher priority than a temperature sensor. In some aspects, the UE may determine the priority level based on a latency budget associated with the data to be transmitted. In this regard, the UE may determine the priority level based on the type of data to be transmitted (e.g., a safety message, sensor measurements, actuator controls, entertainment content, voice, text, authentication, financial, etc.). In some aspects, the UE may determine the priority level based on categories of data defined in a standard (e.g., 3GPP standard, SAE standard, IEEE standard, etc.). In some aspects, the UE may determine the priority level based on receiving the priority level from another node in the communications network (e.g., another UE, a BS, a server, a core network node, etc.). The UE may determine the priority levels as absolute values and a priority level number may be assigned. In some aspects, the UE may determine the priority levels as relative to one another. In this regard, the first UE may have a lower priority level than the second UE, the second UE may have a lower priority level than a third UE, etc.

At 1220, the UE (e.g., the UE 115 or the UE 1000) performs a clear channel assessment for a COT according to an offset parameter. The offset parameter may be based on the priority level associated with the UE as identified at 1210. In this regard, the UE intending to transmit during an FBE frame may perform a CCA for a COT that begins at a time based on the offset parameter. IN this regard, the UE may perform an LBT protocol. The UE may sense the spectrum band using a CCA check before accessing the channel. IN this regard, the UE may first sense the communications channel to find out there is no communication prior to any transmission. In some aspects, the UE may detect energy level on multiple sub-bands of the frequency band. The LBT parameters (e.g., duration, CCA parameters, etc.) may be configured in the UE by the BS. The UE may perform a frame-based equipment (FBE) based LBT in which channel sensing is performed at predetermined time instants. If the channel is busy, the UE may back off for a predetermined time period and sense the channel again after this period. The UE may perform the CCA after the offset time period. For example, the offset parameter may include a time period that begins at a start of the FFP and extends for a length of time associated with an offset time period. Different UEs may be configured with different offset time periods. When a first UE is configured with a priority level higher than a second UE, the first UE may have a shorter offset time period that the second UE. When the first UE performs the CCA after the shorter offset time period, the first UE may gain the COT. When the second UE performs the CCA after the longer offset time period, the second UE may not gain the COT because the transmission of the first UE may cause the second UEs CCA to fail.

Figure 13:
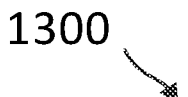
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a BS, such as the BS 105 or the BS 1100, may utilize one or more components, such as the processor 1102, the memory 1104, the priority access module 1108, the transceiver 1110, the modem 1112, and the one or more antennas 1116, to execute the steps of method 1300.

The method 1300 may employ similar mechanisms as described above with reference to FIGS. 2-9. As illustrated, the method 1300 includes a number of enumerated steps, but aspects of the method 1300 may include additional steps before, after, and in between the enumerated steps. In some aspects, one or more of the enumerated steps may be omitted or performed in a different order.

At 1310, a BS (e.g., the BS 105 or the BS 1100) may receive, from a first UE, a signal. In this regard, the signal may be an uplink signal indicating that the first UE has gained access to a COT. In some instances, the uplink signal may include a control message received by the BS over a physical uplink shared channel (PUSCH) and/or a physical uplink control channel (PUCCH). For example, the uplink signal may be an information element included in a control message. The control message may be a specific message indicating that the first UE has gained access to a COT. In some aspects, the control message may be a binary indicator indicating that the first UE has gained access to a COT. In some aspects, the uplink signal indicating that the first UE has gained access to a COT may be included in a reference signal.

At 1320, the BS may transmit, based on receiving the signal from the first UE and based on a priority level associated with the first UE being higher than a priority level associated with a second UE, a receiver protection signal during a time period associated with a clear channel assessment of the second UE. In this regard, the BS may, in response to receiving the uplink signal at 1310, determine a set of time/frequency resources associated with a CCA of the second UE within an FFP. The BS may transmit the receiver protection signal using or more resources that at least partially overlap with the time/frequency resources associated with the CCA of the second, lower priority UE. In this regard, the BS may transmit the receiver protection signal in order to prevent the second, lower priority UE from successfully performing a channel access contention procedure within the FFP. In this regard, the receiver protection signal transmitted by the BS may be configured to cause the CCA of the second, lower priority UE to fail. The receiver protection signal may be any type of signal that may cause the CCA of the lower priority UE to fail, including without limitation a reference signal transmitted via a physical downlink shared channel (PDSCH) and/or a physical downlink control channel (PDCCH).

By way of non-limiting examples, the following aspects are included in the present disclosure.

Aspect 1 includes a method of wireless communication performed by a user equipment (UE), the method comprising identifying a priority level associated with the UE and performing a clear channel assessment for a channel occupancy time (COT) according to an offset parameter, wherein the offset parameter is based on the priority level associated with the UE.

Aspect 2 includes the method of aspect 1, wherein the identifying the priority level associated with the UE comprises identifying the priority level based on a priority level of data associated with the UE.

Aspect 3 includes the method of any of aspects 1-2, wherein the identifying the priority level associated with the UE comprises identifying the priority level associated with the UE based on a priority level of data to be transmitted in the COT.

Aspect 4 includes the method of any of aspects 1-3, wherein the identifying the priority level associated with the UE comprises identifying the priority level based on a type of the UE.

Aspect 5 includes the method of any of aspects 1-4, wherein the offset parameter comprises a time period that begins at a start of a fixed frame period.

Aspect 6 includes the method of any of aspects 1-5, wherein the priority level associated with the UE is higher than a priority level associated with a second UE and the performing the clear channel assessment for the COT is earlier than a clear channel assessment performed by the second UE based on the priority level associated with the UE being higher than the priority level associated with the second UE.

Aspect 7 includes the method of any of aspects 1-6, wherein the priority level associated with the UE is a same priority level associated with a second UE and the offset parameter based on the priority level associated with the UE is a same offset parameter based on the priority level associated with the second UE, and the performing the clear channel assessment for the COT is performed with an earlier offset parameter based on a priority level of data associated with the UE being higher than a priority level of data associated with the second UE.

Aspect 8 includes the method of any of aspects 1-7, further comprising increasing the priority level associated with the UE based on the UE having data for retransmission the performing the clear channel assessment for the COT is performed with an earlier offset parameter based on the UE having data for retransmission than the UE having data for a new transmission.

Aspect 9 includes the method of any of aspects 1-8, wherein the offset parameter comprises a symbol index.

Aspect 10 includes the method of any of aspects 1-9, wherein the performing the clear channel assessment for the COT further comprises performing the clear channel assessment for the COT based on a second offset parameter, wherein the second offset parameter comprises a time offset of a plurality of time offsets associated with the symbol index.

Aspect 11 includes the method of any of aspects 1-10, further comprising selecting the time offset from the plurality of time offsets associated with the symbol index.

Aspect 12 includes the method of any of aspects 1-11, further comprising receiving, from a base station (BS), multiple offset parameters, wherein each offset parameter of the multiple offset parameters is associated with a priority level of data associated with the UE.

Aspect 13 includes the method of any of aspects 1-12, further comprising transmitting a receiver protection signal based upon a successful clear channel assessment.

Aspect 14 includes the method of any of aspects 1-13, wherein the transmitting the receiver protection signal comprises transmitting the receiver protection signal during a time period associated with a clear channel assessment of a second UE.

Aspect 15 includes the method of any of aspects 1-14, further comprising receiving, from a base station (BS), an indicator that indicates a location of the clear channel assessment of the second UE.

Aspect 16 includes the method of any of aspects 1-15, wherein the receiving the indicator that indicates the location of the clear channel assessment comprises receiving the indicator via at least one of downlink control information or a radio resource configuration.

Aspect 17 includes a method of communication performed by a base station (BS), the method comprising receiving, from a first user equipment (UE), a signal and transmitting, based on the receiving the signal and based on a priority level associated with the first UE being higher than a priority level associated with a second UE, a receiver protection signal during a time period associated with a clear channel assessment of the second UE.

Aspect 18 includes the method of aspect 17, wherein the receiver protection signal is configured to cause the clear channel assessment of the second UE to fail.

Aspect 19 includes the method of any of aspects 17-18, wherein the receiver protection signal comprises a reference signal.

Aspect 20 includes the method of any of aspects 17-19, further comprising transmitting, to the first UE, an offset parameter, wherein the offset parameter is based on the priority level associated with the first UE.

Aspect 21 includes a user equipment (UE) comprising a transceiver, a memory, and a processor coupled to the transceiver and the memory, the UE configured to perform any one of aspects 1-16.

Aspect 22 includes a base station (BS) comprising a transceiver, a memory, and a processor coupled to the transceiver and the memory, the BS configured to perform any one of aspects 17-20.

Aspect 23 includes a non-transitory computer-readable medium storing one or more instructions for wireless communication, the one or more instructions comprising one or more instructions that, when executed by one or more processors of a user equipment, cause the one or more processors to perform any one of aspects 1-16.

Aspect 24 includes a non-transitory computer-readable medium storing one or more instructions for wireless communication, the one or more instructions comprising one or more instructions that, when executed by one or more processors of a base station, cause the one or more processors to perform any one of aspects 17-20.

Aspect 25 includes a user equipment (UE) comprising means to perform any one of aspects 1-16.

Aspect 22 includes a base station (BS) comprising means to perform any one of aspects 17-20.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    identifying a first priority level associated with the UE, wherein the first priority level is higher than a second priority level associated with a second UE; and
    performing a clear channel assessment for a channel occupancy time (COT) according to an offset parameter, wherein:
        the offset parameter is based on the first priority level, and
        the performing the clear channel assessment for the COT is earlier than performance of a clear channel assessment by the second UE based on the first priority level being higher than the second priority level.

2. The method of claim 1, wherein the identifying the first priority level comprises:
    identifying the first priority level based on a priority level of data associated with the UE.

3. The method of claim 2, wherein the identifying the first priority level comprises:
    identifying the first priority level based on a priority level of data to be transmitted in the COT.

4. The method of claim 1, wherein the identifying the first priority level comprises:
    identifying the first priority level based on a type of the UE.

5. The method of claim 1, wherein the offset parameter comprises a time period that begins at a start of a fixed frame period.

6. The method of claim 1, wherein the performing the clear channel assessment for the COT comprises:
    performing the clear channel assessment for the COT with an earlier offset parameter based on a priority level of data associated with the UE being higher than a priority level of data associated with the second UE.

7. The method of claim 1, further comprising:
    increasing the first priority level based on the UE having data for retransmission; wherein:
        the performing the clear channel assessment for the COT is performed with an earlier offset parameter based on the UE having data for retransmission than the UE having data for a new transmission.

8. The method of claim 1, wherein the offset parameter comprises a symbol index.

9. The method of claim 8, wherein the performing the clear channel assessment for the COT further comprises:
    performing the clear channel assessment for the COT based on a second offset parameter, wherein the second offset parameter comprises a time offset of a plurality of time offsets associated with the symbol index.

10. The method of claim 9, further comprising:
selecting the time offset from the plurality of time offsets associated with the symbol index.

11. The method of claim 1, further comprising:
receiving, from a base station (BS), multiple offset parameters, wherein each offset parameter of the multiple offset parameters is associated with a priority level of data associated with the UE.

12. The method of claim 1, further comprising:
transmitting a receiver protection signal based upon a successful clear channel assessment.

13. The method of claim 12, wherein the transmitting the receiver protection signal comprises:
transmitting the receiver protection signal during a time period associated with the performance of the clear channel assessment by the second UE.

14. The method of claim 13, further comprising:
receiving, from a base station (BS), an indicator that indicates a location of the clear channel assessment performed by the second UE.

15. The method of claim 14, wherein the receiving the indicator that indicates the location of the clear channel assessment comprises:
receiving the indicator via at least one of downlink control information or a radio resource configuration.

16. A method of wireless communication performed by a base station (BS), the method comprising:
receiving, from a first user equipment (UE), a signal; and
transmitting, based on the receiving the signal and based on a priority level associated with the first UE being higher than a priority level associated with a second UE, a receiver protection signal during a time period associated with a clear channel assessment of the second UE.

17. The method of claim 16, wherein the receiver protection signal is configured to cause the clear channel assessment of the second UE to fail.

18. The method of claim 16, wherein the receiver protection signal comprises a reference signal.

19. The method of claim 16, further comprising:
transmitting, to the first UE, multiple offset parameters, wherein the multiple offset parameters are based on a priority level of data associated with the first UE.

20. A user equipment (UE) for wireless communication, comprising:
one or more antennas;
one or more memories; and
one or more processors coupled to the one or more memories, the one or more processors individually or collectively configured to:
identify a first priority level associated with the UE, wherein the first priority level is higher than a second priority level associated with a second UE; and
perform a clear channel assessment for a channel occupancy time (COT) according to an offset parameter, wherein:
the offset parameter is based on the first priority level, and
performance of the clear channel assessment for the COT is earlier than performance of a clear channel assessment by the second UE based on the first priority level being higher than the second priority level.

21. The UE of claim 20, wherein the one or more processors are further individually or collectively configured to:
identify the first priority level based on at least one of:
a priority level of data to be transmitted in the COT; or
a type of the UE.

22. The UE of claim 20, wherein the offset parameter comprises a time period that begins at a start of a fixed frame period.

23. The UE of claim 20, wherein the one or more processors are further individually or collectively configured to:
increase the first priority level based on the UE having data for retransmission; and
perform the clear channel assessment for the COT with an earlier offset parameter based on the UE having data for retransmission.

24. The UE of claim 20, wherein the one or more processors are further individually or collectively configured to:
perform the clear channel assessment for the COT based on a second offset parameter, wherein the second offset parameter comprises a time offset of a plurality of time offsets associated with a symbol index.

25. The UE of claim 20, wherein the one or more processors are further individually or collectively configured to:
receive, from a base station (BS), multiple offset parameters, wherein each offset parameter of the multiple offset parameters is associated with a priority level of data associated with the UE; and
receive, from the BS, an indicator that indicates a location of a clear channel assessment of a second UE.

26. The UE of claim 20, wherein the one or more processors are further individually or collectively configured to:
transmit a receiver protection signal based upon a successful clear channel assessment during a time period associated with a clear channel assessment of a second UE.

27. The UE of claim 20, wherein, to perform the clear channel assessment for the COT, the one or more processors are individually or collectively configured to:
perform the clear channel assessment for the COT with an earlier offset parameter based on a priority level of data associated with the UE being higher than a priority level of data associated with the second UE.

28. A base station (BS) for wireless communication, comprising:
one or more antennas;
one or more memories; and
one or more processors coupled to the one or more memories, the one or more processors individually or collectively configured to:
receive, from a first user equipment (UE), a signal; and
transmit, based on the receiving the signal and based on a priority level associated with the first UE being higher than a priority level associated with a second UE, a receiver protection signal during a time period associated with a clear channel assessment of the second UE.

29. The BS of claim 28, wherein the receiver protection signal is configured to cause the clear channel assessment of the second UE to fail.

30. The BS of claim 28, wherein the one or more processors are further individually or collectively configured to:

transmit, to the first UE, multiple offset parameters, wherein each offset parameter of the multiple offset parameters is based on a priority level of data associated with the first UE.

* * * * *